Aug. 23, 1927.  
F. M. REID  
1,640,217  
RUNNING GEAR STRUCTURE FOR VEHICLES  
Filed Dec. 3, 1926  
2 Sheets-Sheet 2
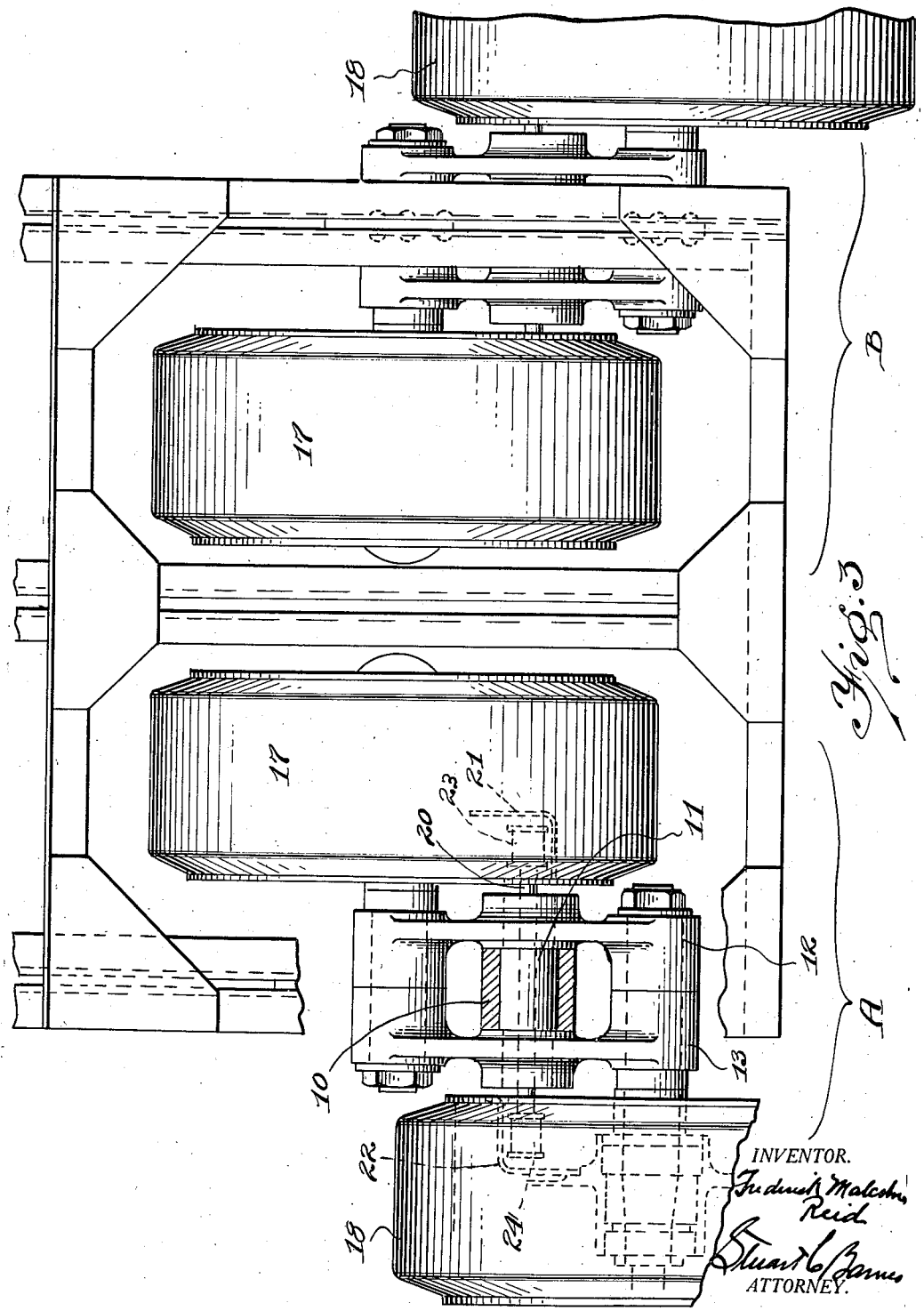

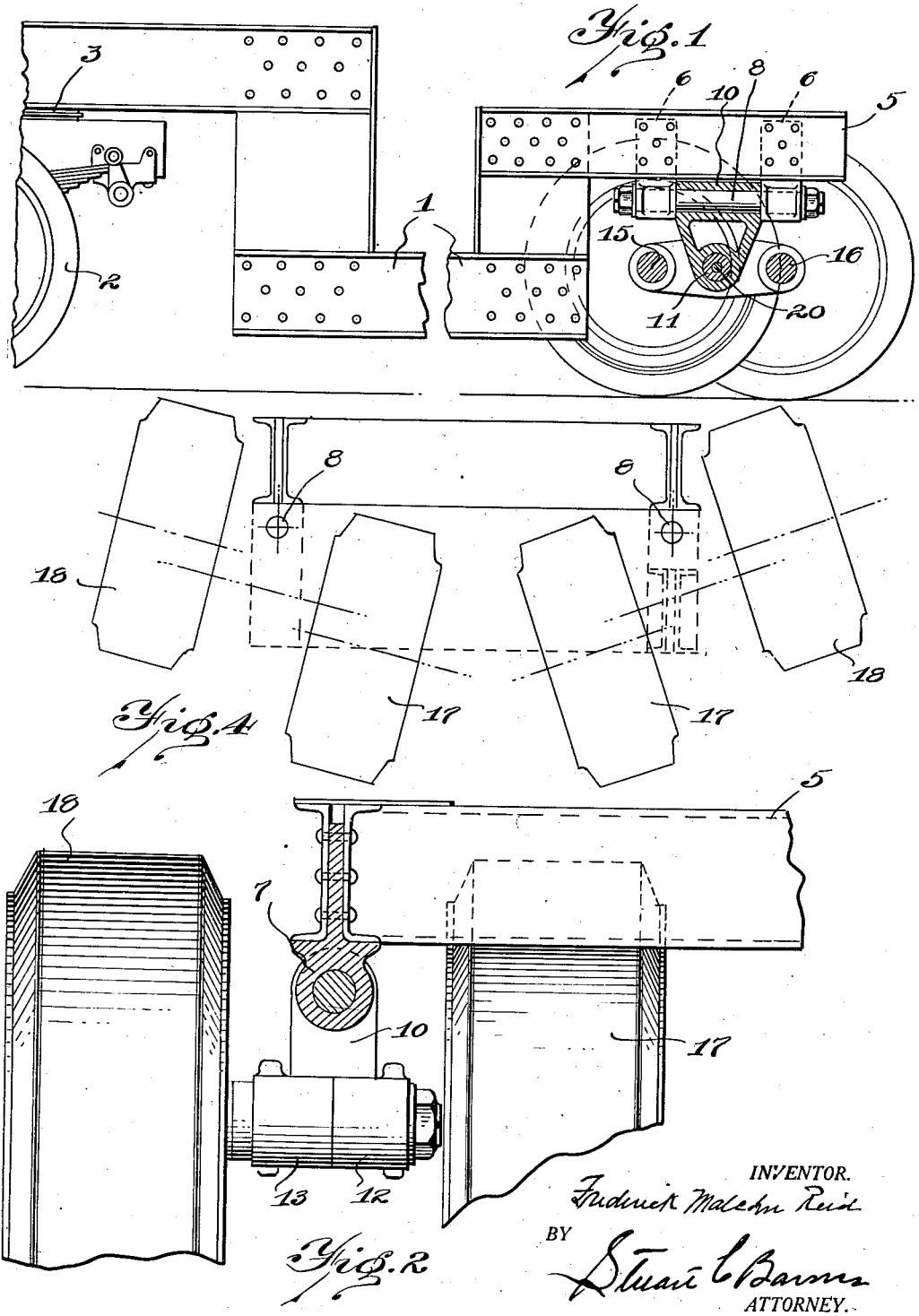

Patented Aug. 23, 1927.

1,640,217

UNITED STATES PATENT OFFICE.

FREDERICK MALCOLM REID, OF DETROIT, MICHIGAN, ASSIGNOR TO FRUEHAUF TRAILER COMPANY, OF DETROIT, MICHIGAN, A CORPORATION OF MICHIGAN.

RUNNING-GEAR STRUCTURE FOR VEHICLES.

Application filed December 3, 1926. Serial No. 152,373.

This invention relates to running gear structure for vehicles, and it has to do more particularly with such a structure for vehicles of heavy duty type.

Heretofore, heavy duty vehicles, which are designed to transport heavy loads over highways, have been provided with ground engaging wheels in sufficient number to distribute the weight over the roadway so that the roadway will not be damaged. It has been proposed to arrange the wheels in pairs, each pair being mounted for pivotal movement in order that the wheels may move over irregularities in the roadway without reducing materially the road engaging surface.

This invention aims to provide an improved running gear which affords wheels in sufficient number for the purpose, and which at the same time affords such relative movement between the wheels as to more efficiently compensate for road irregularities and which makes for ease in drawing the vehicle over such irregularities.

According to the invention, the wheels are arranged in pairs, and two or more pairs may be used at one or both ends of the vehicle. The running gear is such that each pair of wheels is in the nature of a unit, and in this unit there is a double pivoting arrangement which comes into play when one or both wheels meet with a projection or depression in the roadway. This double pivoting arrangement assures equalized road distribution to the wheels, and due to the peculiar arrangement, a wheel in passing over a projection in the road causes the load to move upwardly a distance which is only a part of the height of the projection. This is a distinct advantage as it makes it much easier to pull the load along the roadway. The invention further contemplates a simple and novel way of applying brakes to each wheel, and this is accomplished even though there is a double pivotal arrangement for each pair of wheels.

In the accompanying drawings:

Fig. 1 is a side view, partly in section, of a vehicle constructed in accordance with the invention showing how the wheels are provided with a longitudinal pivotal connection.

Fig. 2 is a rear view of one pair of wheels.

Fig. 3 is a top view, partly in section, of two pairs of wheels supporting one end of a vehicle showing the transverse pivot.

Fig. 4 is a rear diagrammatic view showing approximately maximum displacement of the wheels.

In the accompanying drawings, the vehicle is shown in the form of a trailer adapted to be drawn along the roadway by a truck or tractor. The trailer includes a frame 1 supported at its forward end by wheels 2 through a fifth wheel construction 3. The frame is shown as being of a drop construction to place it close to the roadway. This is advantageous in many ways, but a straight frame can be used if desired.

The rear end of the frame is designed to take the greater part of the load, and it is supported by four wheels arranged in pairs, A and B, each pair constituting a truck. These trucks are identical and a description of one will suffice for both.

The rear end of the frame, with the drop suspension, is raised, as shown at 5. Secured to the frame and extending downwardly therefrom are brackets 6 provided with a bearing-like portion 7 through which a bolt 8 extends. This bolt may be held in place by nuts and lock nuts, as shown, or by any other desired means. Pivotally mounted upon the pin between the brackets 6, is a bracket member 10. Extending through the lower portion of the bracket is the pin 11 which extends at right angles to the pin 8, and which forms a transverse pivot.

Mounted on either end of the pin 11 are members 12 and 13. These members are faced together and are identical, or substantially identical, with each other except for perhaps minor changes made necessary by reason of the fact that one is mounted upon one side of the pin, and one on the other side of the pin. These members pivot on the transverse pin 11. A stub axle 15 is secured to the members 12 and 13 on one side of the transverse pin, and the stub axle 16 is secured in similar manner to the opposite side of the transverse pin. The stub axle 15 rotatably carries a wheel 17 and the stub axle 16 rotatably supports a wheel 18.

By this arrangement it will be seen that the pair of wheels can rock as a unit, on the longitudinal pivot pin 8. At the same time the wheels are disposed in a staggered relation and have another pivotal movement on the transverse pin 11. When the vehicle is moving along the roadway and one of the wheels, as for example the outside wheel 18, encounters a projection, it is raised relative to the wheel 17. This causes a rocking of the main supporting bracket 10 upon its longitudinal pivot. At the same time, it causes a rocking of the members 12 and 13 upon the transverse pivot pin 11. By referring to Fig. 1, it will be seen that inasmuch as the stub axle 15 remains in a fixed position, or substantially so, the stub axle 16 raises by reason of the raising of its wheel and that the transverse pin 11 is raised to a less degree than the stub axle 16. Consequently, the load supported by the vehicle does not have to be lifted to a height equal to the roadway projection. This makes it easier to draw a given load along the roadway. In Fig. 4 the maximum, or substantially maximum displacement of the wheels is shown. It will be observed that the wheels of each pair is rotated as a unit upon the longitudinal pivot, and it will also be observed that the center of the wheels, that is, the stub axles, have been thrown out of alignment. The stub axle of the wheel which is raised is higher than the transverse pivot 11, and the stub axle of the wheel, which is lowermost, is lower than the transverse pivot. This comes from the pivotal movement on the transverse pivot.

Even though the wheels are disposed in a staggered relation, a brake mechanism is afforded for applying the brakes to the wheels. For this purpose the transverse shaft 11 may be provided with a bore through which extends a brake operating shaft 20. The wheels are provided with brake drums 21 and 22, and the shaft 20 projects sufficiently so as to be in position to actuate the braking mechanism associated with the drums. On the ends of the shaft are mounted cams 23 and 24 for actuating the brake mechanism. As shown in the drawings the brakes may be of the internal expanding type in which case the brake shaft extends within the drums, but of course the brake mechanism may be of the external contracting type.

By this arrangement the brake is applied to each wheel by the single shaft. The shaft may be actuated by a lever advantageously located, and connected to the shaft by suitable links and levers of standard construction. Due to the fact that the vehicle is designed for carrying heavy loads, it may be desirable to actuate the shaft by air pressure or hydraulic means, in which case such means can be connected to the shaft so as to rock the same.

The running gear structure has been shown and described in connection with a trailer. The structure is nicely adapted for use with a trailer, but of course it is not limited to a trailer and it is the intention that the use of the running gear structure with other vehicles, such as those which move under their own power, is within the spirit of the invention.

I claim:

1. In a vehicle, a frame, a plurality of wheels arranged in pairs for supporting one end of the frame, each pair of wheels being secured to the frame on a fore and aft directed pivot and on a separate transversely directed pivot the latter eccentric to the said wheels.

2. In a vehicle, a frame, a plurality of wheels arranged in pairs for supporting one end of the frame, each pair of wheels being secured to the frame on separate pivots so as to have a double pivotal movement in vertical planes with respect to the frame and on centers eccentric to the wheels.

3. In a vehicle, a frame, a pair of trucks for supporting one end of the frame, each truck including one pair of wheels, a longitudinally extending pivotal connection for securing the truck to the frame, and a transverse pivotal connection for securing the wheels to the truck; the latter being eccentric to the wheels.

4. In a vehicle, a frame, a pair of trucks for supporting one end of the frame, each truck including one pair of wheels, a longitudinally extending pivotal connection for securing the truck to the frame, and a separate transverse pivotal connection for securing the wheels to the truck, one wheel being forward of the transverse pivot and the other wheel to the rear thereof 5. In a vehicle, a frame, a pair of trucks arranged side by side for supporting one end of the frame, each truck consisting of two wheels in staggered relation, separate pivot means connecting each truck to the frame which affords a double pivotal movement of the wheels with respect to the frame on centers eccentric to the wheels.

6. In a vehicle, a frame, a pair of trucks arranged side by side for supporting one end of the frame, each truck consisting of two wheels in staggered relation, means pivotally connecting each truck to the frame as a unit, and means pivotally connecting the wheels to the truck, said pivotal connection being disposed at substantially right angles to each other.

7. In a vehicle, a frame, a pair of trucks arranged side by side for supporting one end of the frame, each truck consisting of two wheels in staggered relation, means pivotally connecting each truck to the frame as a unit, and means pivotally connecting the wheels to the truck, the pivotal connection for the truck extending longitudinally of the frame, and the pivotal connection for the wheels extending transversely of the frame.

8. In a vehicle, a frame, a truck for supporting the frame, this truck consisting of a pair of wheels spaced transversely of the vehicle, and one wheel in advance of the other, and a single brake operating means for operating the brakes of each wheel.

9. In a vehicle, a frame, a truck for supporting the frame, this truck consisting of a pair of wheels spaced transversely of the vehicle, and one wheel in advance of the other, and a single brake operating shaft extending through one of the pivotal connections for operating the brakes of each wheel.

10. In a vehicle, a frame, a truck for supporting the frame, this truck consisting of a pair of wheels disposed in a staggered relation, the wheels being spaced transversely and one wheel in advance of the other, and a single brake operating means for simultaneously actuating the brake mechanism of each wheel.

In testimony whereof I affix my signature.

FREDERICK MALCOLM REID.